US011903482B2

(12) United States Patent
Honermann et al.

(10) Patent No.: US 11,903,482 B2
(45) Date of Patent: Feb. 20, 2024

(54) DISPLAY DEVICE

(71) Applicant: Quality Wood Designs Inc., Mitchell, SD (US)

(72) Inventors: Michael Honermann, Mitchell, SD (US); Victor Honermann, Mitchell, SD (US)

(73) Assignee: Quality Wood Designs Inc., Mitchell, SD (US)

( * ) Notice: Subject to any disclaimer, the term of this patent is extended or adjusted under 35 U.S.C. 154(b) by 0 days.

(21) Appl. No.: 15/801,195

(22) Filed: Nov. 1, 2017

(65) Prior Publication Data

US 2018/0160806 A1 Jun. 14, 2018

Related U.S. Application Data

(60) Provisional application No. 62/415,718, filed on Nov. 1, 2016.

(51) Int. Cl.

| | |
|---|---|
| ***A47B 88/427*** | (2017.01) |
| ***A47B 81/00*** | (2006.01) |
| ***A47B 88/407*** | (2017.01) |
| ***F41C 33/06*** | (2006.01) |
| ***E06B 3/42*** | (2006.01) |

(Continued)

(52) U.S. Cl.

CPC ............ *A47B 88/427* (2017.01); *A47B 81/00* (2013.01); *A47B 81/005* (2013.01); *A47B 88/407* (2017.01); *F41C 33/06* (2013.01); *A47B 88/988* (2017.01); *A47B 2088/4278* (2017.01);

(Continued)

(58) Field of Classification Search

CPC ......... A47B 46/00; A47B 61/00; A47B 61/02; A47B 67/04; A47B 88/40; A47B 88/402; A47B 88/0455; A47B 88/407; A47B 88/0407; A47B 88/42; A47B 88/0485; A47B 88/423; A47B 88/0418; A47B 88/427; A47B 88/0422; A47B 88/43; A47B 88/044; A47B 88/988; A47B 88/00; A47B 2210/0056; A47B 2210/09; A47B 2210/091; A47B 81/00; A47B 81/005; A47B 2088/4274; A47B 2088/0429; A47B 2088/4278; A47B 2088/0437; E06B 3/42; A47F 3/063; A47F 3/06; A47F 3/125; A47F 7/0021; E05G 1/00

See application file for complete search history.

(56) References Cited

U.S. PATENT DOCUMENTS 2,857,233 A * 10/1958 Hahn .................. A47B 88/483 312/334.31
3,038,774 A * 6/1962 Cyrus .................. F25D 25/025 312/350

(Continued)

FOREIGN PATENT DOCUMENTS

DE 19537739 A1 * 4/1997 ........... A47F 3/0408
GB 2482352 A * 2/2012 ............ A47F 3/004

*Primary Examiner* — Andrew M Roersma
(74) *Attorney, Agent, or Firm* — Westman, Champlin & Koehler P.A.

(57) ABSTRACT

A cabinet may include an enclosure having sidewalls and a base. Further, the firearm cabinet may include a plurality of holders within the enclosure and configured to slide into and out of the enclosure at an angle other than perpendicular relative to a face of the cabinet. In some aspects, the cabinet may be configured to secure a plurality of elongate objects, such as pool cues, fishing poles, firearms, and so on.

10 Claims, 7 Drawing Sheets

(51) Int. Cl.
*E05G 1/00* (2006.01)
*A47B 88/988* (2017.01)
*F41C 33/00* (2006.01)

(52) U.S. Cl.
CPC .................. *E05G 1/00* (2013.01); *E06B 3/42* (2013.01); *F41C 33/00* (2013.01)

(56) References Cited

U.S. PATENT DOCUMENTS 3,927,923 A * 12/1975 Kimmel .................. A47F 5/025 211/64
4,274,688 A * 6/1981 Zacky ................... E06B 3/4663 312/304
4,289,290 A * 9/1981 Miller .................... A47B 88/43 248/251
4,555,147 A * 11/1985 Jackson ................. A47B 88/43 384/19
4,741,628 A * 5/1988 Kinley ................. A47B 88/407 384/22
5,025,545 A * 6/1991 Brown ................... A47B 88/40 29/434
5,299,509 A * 4/1994 Ballard .................. A47B 96/02 108/106
5,615,936 A * 4/1997 Simmons ............... A47B 17/00 312/238
5,795,040 A * 8/1998 Simmons ............ B42F 15/0094 312/183
6,497,185 B1 * 12/2002 Barrett ................. A47B 96/025 108/108
7,178,889 B2 * 2/2007 Hoshide ................. A47B 88/40 312/334.1
7,478,892 B2 * 1/2009 Punzel ................. A47B 81/005 211/64
7,731,310 B2 * 6/2010 Kohlmann ............. A47B 67/04 312/228
7,877,920 B2 * 2/2011 Szuminski ........... A47B 81/005 109/51
8,109,581 B1 * 2/2012 Lazenby ................ A47B 88/42 312/330.1
8,733,865 B1 * 5/2014 Chambers .............. A47B 88/42 312/334.32
9,198,512 B1 * 12/2015 Moayeri .............. A47B 81/005
2004/0164036 A1 * 8/2004 Cummins .............. A47B 49/00 211/64
2006/0283820 A1 * 12/2006 Peters .................. A47B 81/005 211/64
2007/0024165 A1 * 2/2007 Moulton .............. A47B 81/005 312/291
2011/0168649 A1 * 7/2011 Stolz .................... A47B 81/005 211/64
2011/0273066 A1 * 11/2011 Eric .................... E05B 65/0864 312/139.2
2012/0152767 A1 * 6/2012 Harry ................... A47B 81/005 206/216
2014/0197121 A1 * 7/2014 Knight ................. A47B 88/994 29/428
2015/0101516 A1 * 4/2015 Suggs ...................... E05G 1/026 109/64
2016/0095432 A1 * 4/2016 Wirthlin ............... A47B 81/005 211/64

* cited by examiner

DISPLAY DEVICE

CROSS-REFERENCE TO RELATED APPLICATION(S)

The present application is a non-provisional of and claims priority to U.S. Provisional Patent Application No. 62/415,718 filed on Nov. 1, 2016 and entitled "Display Cabinet", which is incorporated herein by reference in its entirety.

FIELD

The present disclosure is generally related to display cases and cabinets, and more particularly to a display cabinets that can be used to display elongate objects, such as pool cues, firearms, and other elongate items.

BACKGROUND

Conventionally, elongate objects may be lined up on shelves or displayed in a row within a display case. For example, firearms may be stored in cabinets or safes, which may be bulky and heavy and which do not permit display of the firearm. Some store owners may secure their firearms in a locked box or chest; however, such security does not allow for display of the firearm to a potential consumer. As another example, some store owners may display their firearms in a glass enclosed cabinet that is lockable using a combination of nooses, bolts, hooks, straps and magnets to fasten the firearm against the cabinet wall; however, such displays provide limited display area.

SUMMARY

In some embodiments, a display device may include a mounting structure configured to couple to a surface of a structure and may include a slidable holder slidably coupled to the mounting structure. The slidable holder may include a base portion configured to couple to the mounting structure. The base portion may be configured to secure a proximal end of an object. The slidable holder may further include a frame coupled to the base portion and extending substantially vertically relative to the base portion. The slidable holder may also include a gripper element coupled to the frame and configured to secure a second portion of the object. In some embodiments, the gripper element may be a component of an arm extending from the frame.

In some embodiments, a display cabinet may include an enclosure having sidewalls and a base. Further, the display cabinet may include a plurality of holders within the enclosure and configured to slide into and out of the enclosure at an angle other than perpendicular relative to a face of the display cabinet. In some embodiments, the display cabinet may be configured to display an elongate product, such as a pool cue, a firearm, or another product.

In some embodiments, a cabinet may include a plurality of holders configured to secure a plurality of products or items and to slide in and out of the cabinet, independently, on drawer slides. In certain embodiments, the holders may slide in and out at an angle other than perpendicular to the face of the cabinet. Further, the cabinet may include sliding doors configured to open to provide access to and to close to secure the products or items within the cabinet. In some embodiments, the holders may include a base configured to secure a stock of each of a plurality of firearms and a frame configured to secure a barrel of each of the plurality of firearms. In other embodiments, the holders may include a base configured to secure a proximal end of each of a plurality of pool cues and a frame configured to secure a second portion of each of the pool cues. In other embodiments, other elongate objects or items may be secured by the cabinet.

In some embodiments, a cabinet may include a substantially rectangular enclosure sized to house a plurality of elongate objects. The enclosure includes sidewalls and a base. The cabinet may further include a plurality of holders, each holder including a base portion configured to secure a first portion of each of a plurality of elongate objects and including a frame portion coupled to the base portion and configured to secure a second portion of each of the plurality of elongate objects. The base portion may be configured to move relative to the enclosure. In some aspects, the base portion may be coupled to the base of the enclosure by one or more drawer slides. Further, in some aspects, the base may be configured to extend out from the enclosure at an angle other than perpendicular relative to an edge of the base.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
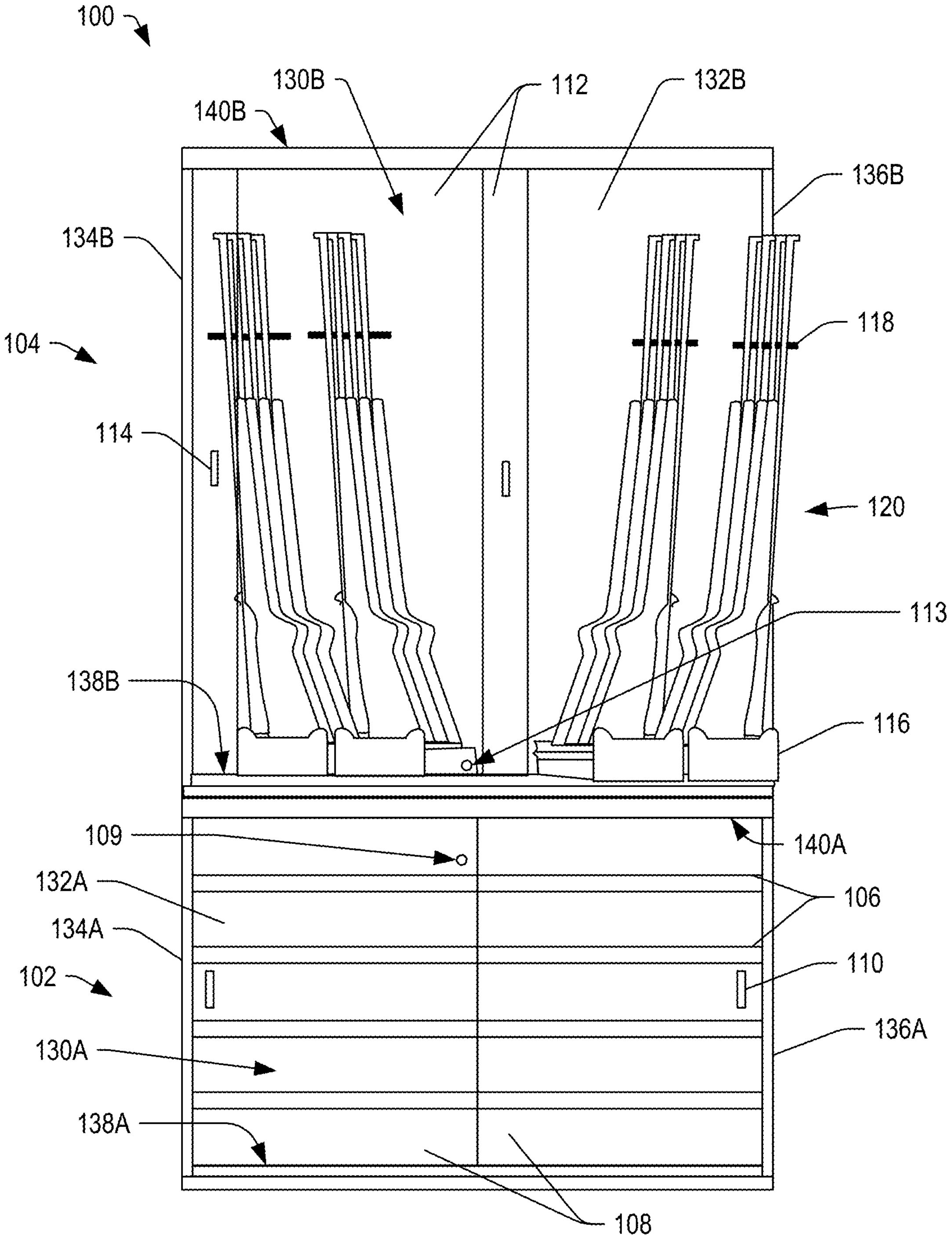
FIG. 1 depicts a front view of a display cabinet, in accordance with certain embodiments of the present disclosure.

Embodiments of display devices are described below that may include a mounting structure configured to couple to a surface of a structure and may include a slidable holder slidably coupled to the mounting structure. The slidable holder may include a base portion configured to couple to the mounting structure. The base portion may be configured to secure a proximal end of an object. The slidable holder may further include a frame coupled to the base portion and extending substantially vertically relative to the base portion. The slidable holder may also include a gripper element coupled to the frame and configured to secure a second portion of the object. In some embodiments, the gripper element may be a component of an arm extending from the frame.

In some embodiments, the display device may include a cabinet. The cabinet may include a display portion defining an enclosure that may include one or more slidable elements configured to pull outward from the enclosure horizontally and at an angle other than ninety degrees relative to a face of the cabinet. In some embodiments, the display portion may be a standalone cabinet. In other embodiments, the display portion may rest on top of a base portion. In still other embodiments, the base portion may form a standalone cabinet. In certain embodiments, the base portion may include sidewalls, a base, a rear wall, and a plurality of shelves. The plurality of shelves may be adjusted. Further, the base portion may include sliding doors that may be locked in a closed position.

The display portion may include sidewalls, a base, a rear wall, and a top portion defining an enclosure. The display portion may include a plurality of holders coupled to the base by drawer pulls and configured to slide into and out from the enclosure, independently from one another. Each holder may include a base portion configured to secure a first portion of each of a plurality of elongate objects and a frame portion extending from the base portion and configured to secure a second portion of each of the plurality of elongate objects. Further, each of the holders may be configured to extend from the enclosure at an angle that is other than perpendicular to a face of the display portion.

It should be appreciated that the display apparatus may be configured to secure and display a plurality of different types of objects. In a particular aspect, the apparatus may be a display cabinet configured to display a plurality of elongate objects, such as pool cues, baseball bats, golf clubs, firearms, fishing poles, other elongate objects or any combination thereof. In the following discussion, the apparatus is shown in a configuration that is designed to secure and display firearms; however, it should be appreciated that other types of elongate objects can easily be accommodated by utilizing a holder having a different base, different gripping elements, or any combination thereof. One possible example of a display apparatus including a cabinet and one or more slidable holders that can be configured to display firearms is described below with respect to FIG. 1.

FIG. 1 depicts a front view of a firearm display cabinet 100, in accordance with certain embodiments of the present disclosure. In the illustrated example, the cabinet 100 may include a base or lower portion 102 and a display or upper portion 104. In other embodiments, the cabinet 100 may include the lower or base portion 102, the upper or display portion 104, or any combination thereof.

The base portion 102 may include a plurality of shelves 106. Further, the base portion 102 may include sliding doors 108 with handles 110, which may slide open to allow access to the shelves 106 and which may slide closed to secure the contents of the shelves 106. In some embodiments, the sliding doors 108 may be formed from a translucent material, such as glass, plastic, composite material, other similar material, or any combination thereof. Further, in some embodiments, the shelves 106 may be adjustable. In the illustrated example, the base portion 102 may include a rear wall 132A, a first sidewall 134A, a second sidewall 136A and a base 138A defining the enclosure 130A, which may be sized to receive a plurality of shelves 106. In some embodiments, the base portion 102 may also include a top wall 140. The sliding doors 108 may include a locking mechanism 109 configured to secure the sliding doors 108 in a closed state to secure the contents of the shelves 106. Other embodiments are also possible.

In certain embodiments, the upper portion or display portion 104 may include a rear wall 132B, a first sidewall 134B, a second sidewall 136B and a base 138B defining the enclosure 130B. In some embodiments, a top portion or ceiling 140B of the cabinet 100 may also be provided that may include lights or that may allow ambient light to reach the items within the upper portion or display portion 104. The upper portion or display portion 104 may include sliding doors 112 with handles 114, which may be opened to allow access to the enclosure 130 or which may be closed to secure the enclosure 130. Further, the sliding doors 112 may include a locking mechanism 113 configured to secure the sliding doors 112 in a closed state to secure the contents of the enclosure 130B. The display portion 104 may further include a plurality of holders 116, which may be configured to secure the stock of each of a plurality of firearms 120. Each of the plurality of holders 116 may also include a frame having a gripping element 118 configured to secure the muzzle of each of the firearms 120.

In some embodiments, the sliding doors 112 and 108 can be removed. In an example, the sliding doors 112 and 108 may slide within a set of tracks, which may be screwed to the cabinet at a top and a bottom of the upper portion 104 and at a top and a bottom of the lower portion 102. To remove the sliding doors 112 or 108, one of the doors 112 or 108 may be slide to one side, and the user may reach through the opening to unfasten one or more screws that couple the set of tracks to the cabinet 100. Once the screws are unfastened, the tracks may be shifted to allow the user to slide the sliding doors 112 or 108 off of the ends of the tracks. In some embodiments, it may be necessary to remove at least one of the fasteners from both the upper and the lower sets of tracks to allow for removal of the sliding doors 112 or 108. Other embodiments are also possible.

The holders 116 may be coupled to drawer slides or drawer hardware coupled to the base 138 to enable the holders 116 to be slid in and out of the enclosure. Each of the drawer slides or drawer hardware may be attached to the base 138 by a fastener, such as bolts, pop rivets, or screws, and may be of sufficient strength to support the holder 116, the frame, the gripping element 118, and the plurality of firearms 120. Further, the drawer slides or drawer hardware may be coupled to the base 138 at an angle relative to the face of the upper portion 104, such that the holders 116 may be extended out from the enclosure at an angle, which may facilitate display of the plurality of firearms 120. In a particular example, the holders 116 may extend at an angle such that the holders 116 may extend beyond a peripheral edge of the sidewalls 134 or 136, when fully extended.

In some embodiments, the holder 116 may include an insert having a plurality of structures or cavities, each of which may be sized to receive a stock of one of the firearms 120 to maintain the firearm 120 at a desired spacing and orientation relative to the other firearms. The insert may be formed from foam or may be formed from another material and may be covered with felt or another soft fabric to prevent the insert from scratching or otherwise damaging the stocks during insertion and removal from the holder 116.

In the example depicted in FIG. 1, the cabinet 100 is depicted as including both an upper portion 104 and a lower portion 102, each of which may include a rear wall 132, sidewalls 134 and 136, a base 138, and a top wall 140. However, in other embodiments, each of the upper portion 104 and the lower portion 102 may be freestanding fixtures with sides, a base, and top. In other implementations, the cabinet 100 may include the sides 134 and 136, the top 140, the base 138, the rear wall 132, or any combination thereof. Other embodiments are also possible.

It should be appreciated that the plurality of holders 116 are depicted as being enclosed within the cabinet 100; however, the holders 116 may be configured to couple directly to a wall, a shelf unit, or another support structure. In an example, a rear portion of the holder 116 may be coupled to a mounting base that can couple to a surface of a structure. Other embodiments are also possible.

Figure 2:
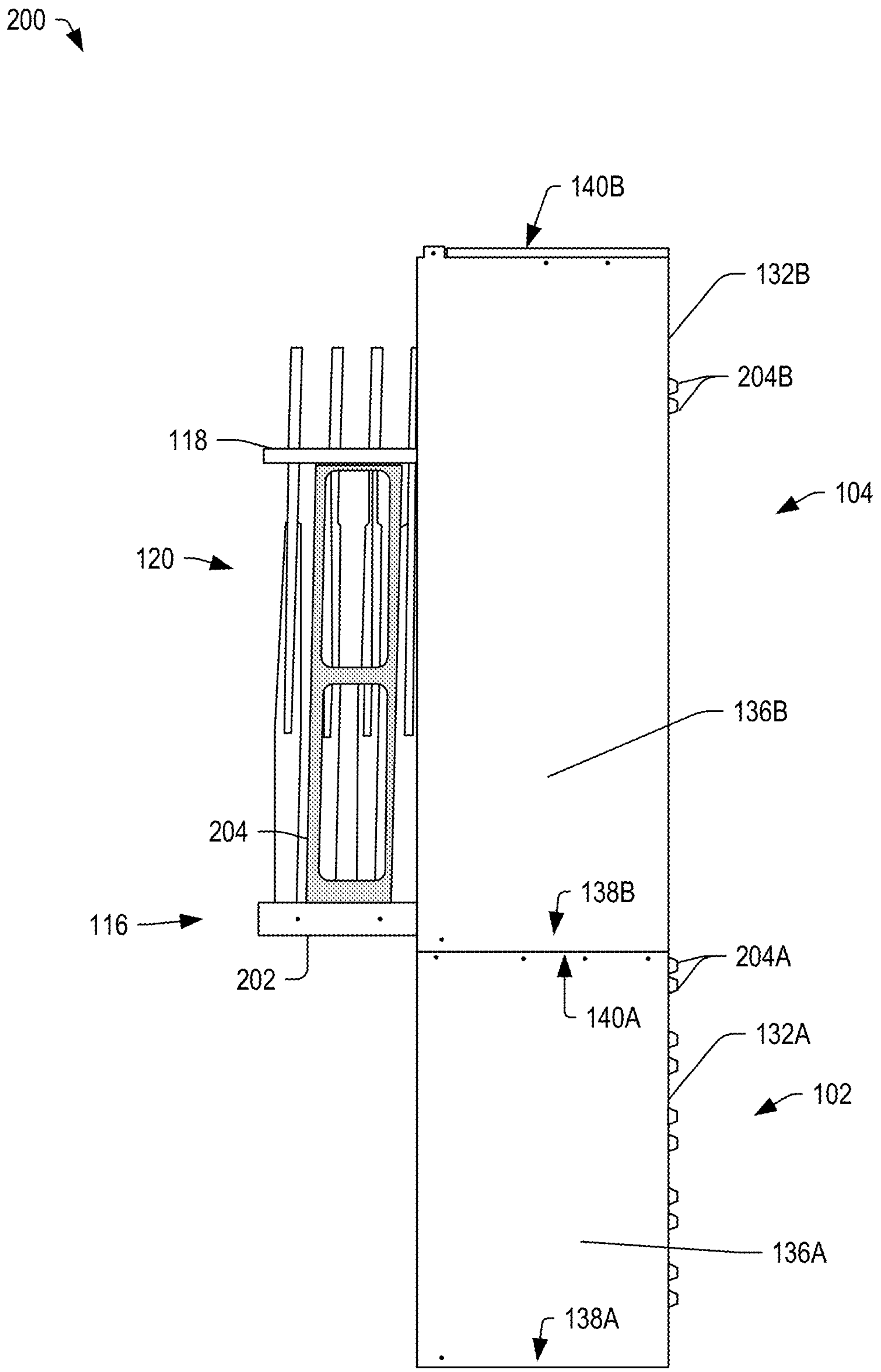
FIG. 2 depicts a side view of the display cabinet with a holder extended, in accordance with certain embodiments of the present disclosure.

FIG. 2 depicts a side view 200 of the firearm display cabinet 100 with a firearm holder 116 in an extended state, in accordance with certain embodiments of the present disclosure. In certain embodiments, the holder 116 can include a base portion 202 and a frame 204, which may be coupled to a base portion 202. The base portion 202 may have a box-shape and may extend substantially parallel to a plane corresponding to the base 138. The frame 204 may be coupled to the base portion 202 of the holder 116 and may extend from the base portion 202 at an angle that is substantially vertically relative to the base portion of the holder 116. The frame 202 may include one or more gripping elements 118 configured to secure the muzzle of each of the firearms 120. In some embodiments, at least one of the base portion 202, the frame 204, and the gripping elements 118 may be configured to lock the firearms 120 in place to prevent unauthorized removal. Other embodiments are also possible.

In certain embodiments, the frame 204 may include two elongate side members coupled to the base 202 and may include at least one crossbar member coupled between the two elongate side members to provide support. Such a structure reduces the weight of the frame 204, as compared to a solid vertical wall, allowing the base portion 202 to extend beyond the extent of the base 138 to facilitate both display of and access to the plurality of firearms.

Further, in the illustrated example, the display portion 104 includes a plurality of brackets 204B, which may be configured to fit any current fixture to couple the display portion 104 to a supporting structure, such as a wall or another structure. Further, the base portion 102 may be provided with a plurality of brackets 204A, which may be configured to fit any current fixture to couple the base portion 102 to a supporting structure.

Figure 3:
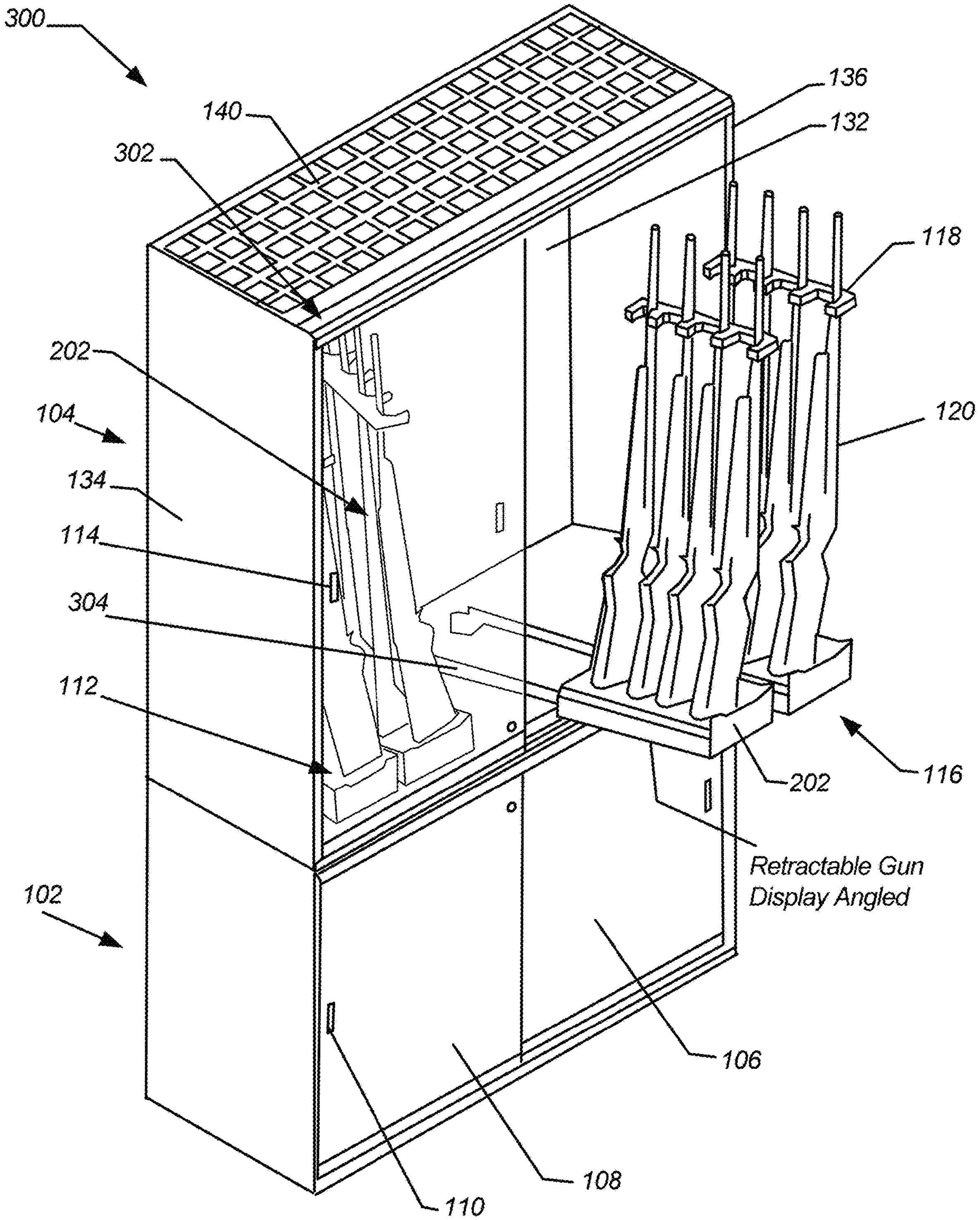
FIG. 3 depicts a perspective view of a display cabinet with two holders extended, in accordance with certain embodiments of the present disclosure.

FIG. 3 depicts a perspective view 300 of a firearm display cabinet 100 with two firearm holders 116 extended, in accordance with certain embodiments of the present disclosure. In the illustrated example, the base portion 202 and the associated frame 204 with the gripping elements 118 may cooperate to secure up to four firearms 120. In other examples, the base portion 202 and the gripping elements 118 may be configured to secure any number of firearms 120. Depending on the number of firearms 120 within each holder 116, the drawer slides may be constructed or selected to support the weight. In some examples, an additional load-bearing support may be added beneath the base portion 116 to provide additional support. Other embodiments are also possible.

Figure 4:
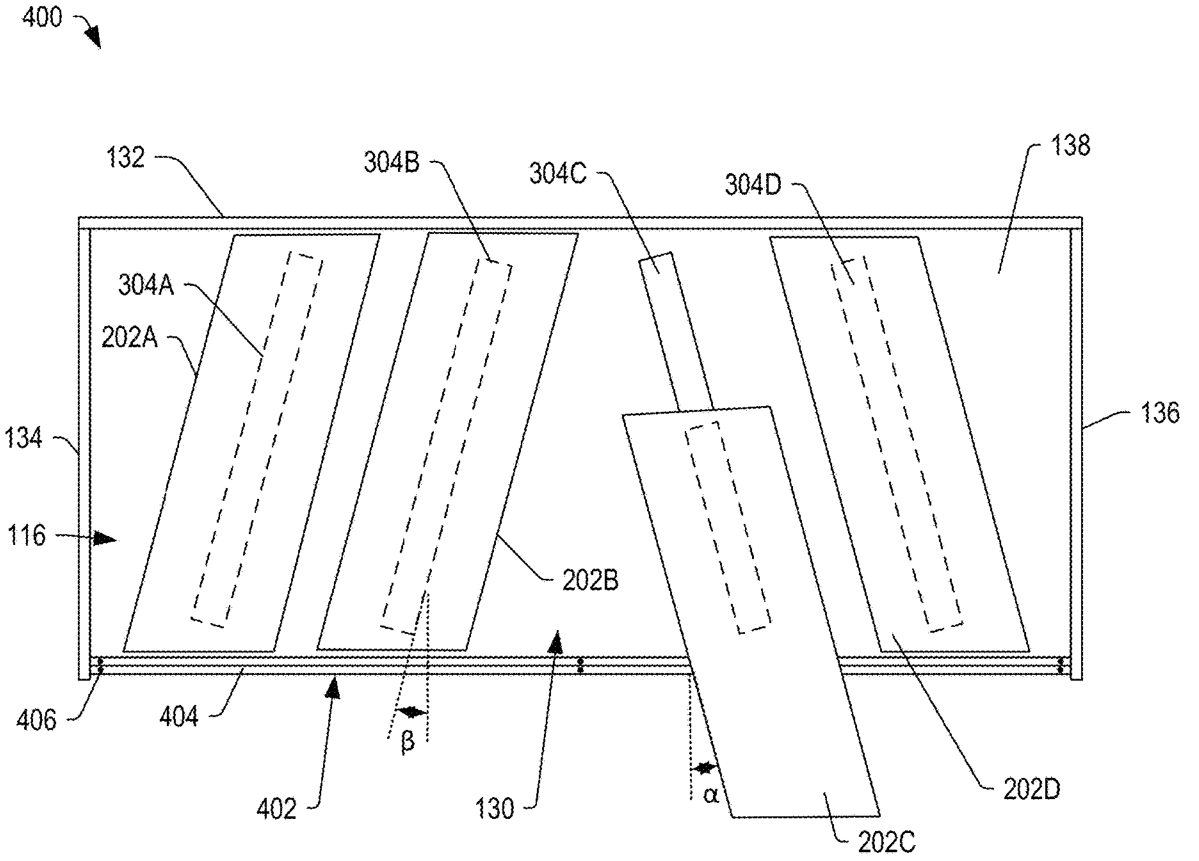
FIG. 4 depicts a top view of an interior of an enclosure of a display cabinet, in accordance with certain embodiments of the present disclosure.

FIG. 4 depicts a top view 400 of an interior of an enclosure 130 of a firearm display cabinet 100, in accordance with certain embodiments of the present disclosure. In the illustrated example, four holders 116 are depicted. The four holders 116 include a first base portion 202A, a second base portion 202B, a third base portion 202C, and a fourth base portion 202D, each of which is coupled to the base 130 by a corresponding drawer slide or drawer hardware 304A, 304B, 304C, and 304D. In some embodiments, the base portions 202 have substantially parallelogram shapes configured to fit within the enclosure. In some embodiments, the base portions 202 may have substantially rectangular shapes.

In certain embodiments, the drawer hardware elements 304A and 304B may be coupled to the base 130 at an angle (α) that is other than perpendicular (other than 90 degrees) relative to a front face 402 of the cabinet 100. The drawer elements 304C and 304D may be coupled to the base 130 at an angle (β) that is other than perpendicular (other than 90 degrees) relative to a front face 402 of the cabinet 100. In some embodiments, the angles (α and β) may be inverses of one another. The angles may be selected to allow the base portions 202 to clear the sidewalls 134 or 136 when they are extended while exposing each of the items secured by the holders 116.

Further, along the front face 402 of the base 130, a set of tracks 404 are provided that may be secured to the base 130 by fasteners 406. Sliding doors 112 may slide within the tracks to open and close the enclosure 130. As previously mentioned, one of the doors may be slid toward one side to allow access to the fasteners 406, which may then be removed to allow the user to slide the sliding doors 112 out one of the sides. Other embodiments are also possible.

Figure 5:
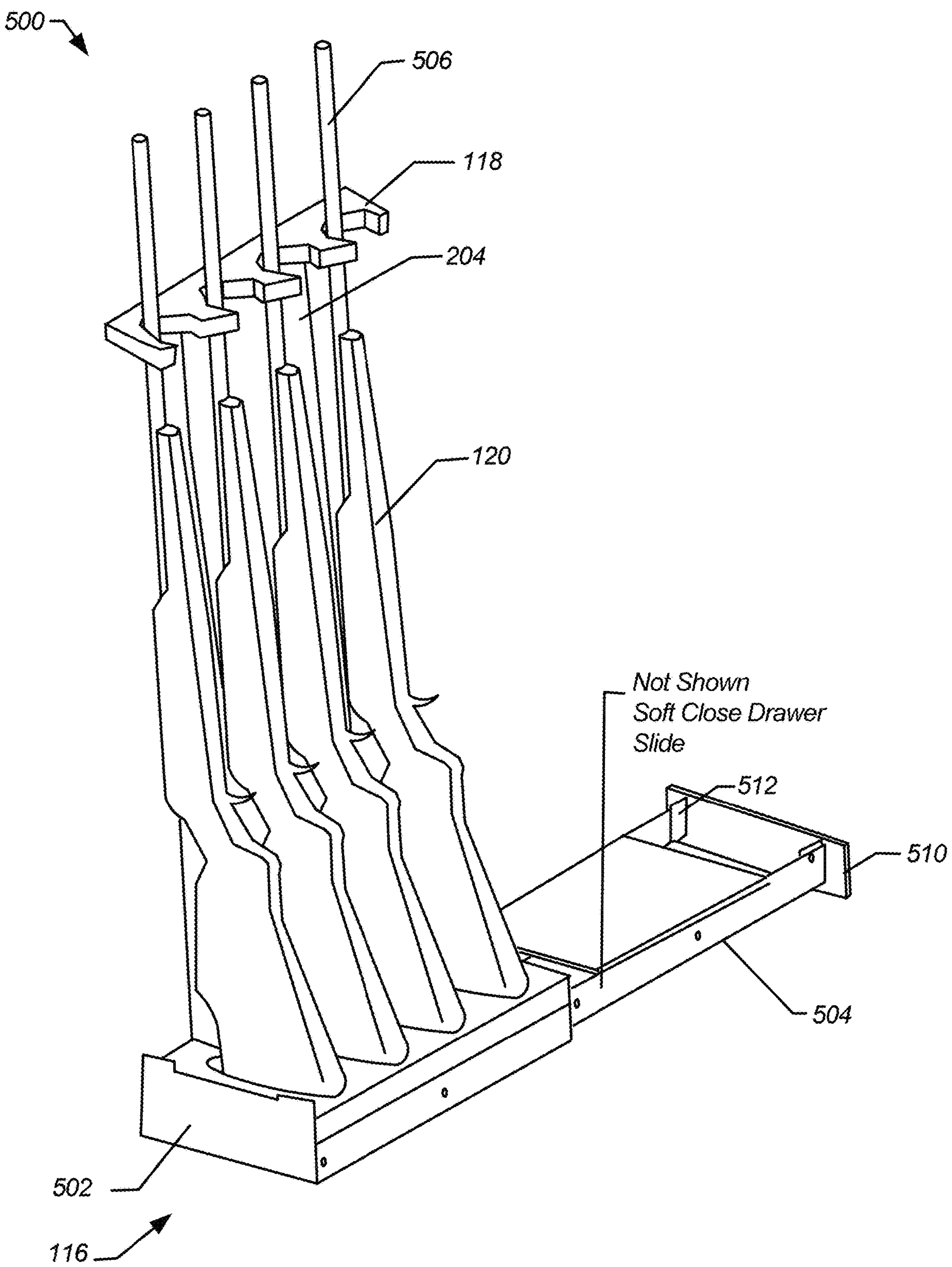
FIG. 5 depicts a perspective view of a holder and associated sliding mechanisms, in accordance with certain embodiments of the present disclosure.

FIG. 5 depicts a perspective view 500 of a holder 116 and associated sliding mechanisms, in accordance with certain embodiments of the present disclosure. The holder 116 includes a base portion 502, which may be configured to slidably engage a support structure 504, which may include tracks configured to engage a soft-close drawer slide (not shown), which may be beneath a portion of the base portion 502. In some embodiments, the support structure 504 may be configured to engage drawer slides associated with a base 138 of the display cabinet 100 and may be configured to slide relative to the base 138 to provide further extension for the base portion 502. In other embodiments, the support structure 504 may be fixed to the base 138 and the base portion 502 may slide relative to the support structure 504.

The base portion 502 may be coupled to the frame 204, which may include the gripping elements 118. The base portion 502, the frame 204, and the gripping elements 118 may be configured to secure an elongate object, such as a firearm 120. In the illustrated example, the gripping elements 118 may be configured to grip the muzzle 506 of each of the firearms. However, in other embodiments, the gripping elements 118 may be configured to secure a fishing rod, a distal end of a pool cue, or a portion of another elongate object.

It should be appreciated that the holder 116 of FIG. 5 may be utilized with the display portion 104 of any of the embodiments shown in FIGS. 1-4. Further, it should be understood that the embodiment of the soft close drawer slide depicted in FIG. 5 is one possible embodiment of many different examples of drawer slides and supporting structures. In other implementations, a different type of slide and a different type of supporting structure may be used. In still other embodiments, the supporting structure 504 may be omitted or may be replaced with a different type of slide extension element configured to allow the base portion 502 to extend outside of the enclosure 130 of the cabinet 100.

In some embodiments, the support structure 504 may be configured to couple to a mounting base 510, which may be attached to an interior surface of a rear wall of the cabinet 100 or which may be coupled directly to a surface of a structure, such as a wall. The mounting base 510 may include a coupling feature 512 configured to engage the support structure 504. In some embodiments, the coupling feature 512 may attach to the support structure 504 using a clip, threaded fasteners, or other. In a particular example, the mounting base 510 may include a hook, a z-clip, or another attachment feature to releasably engage the surface of the structure. In other embodiments, the mounting structure 510 may include one or more openings to receive a threaded fastener, such as a screw. Other embodiments are also possible.

Figure 6A:
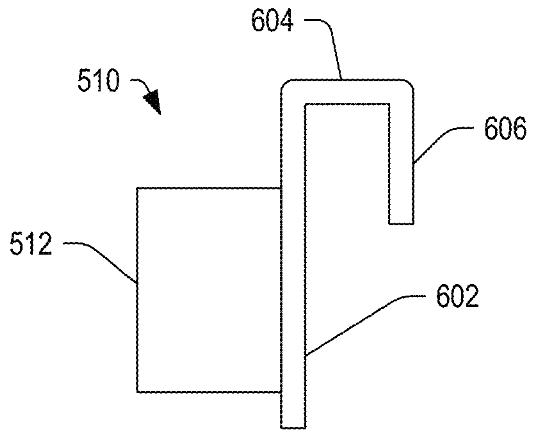
FIGS. 6A-6C depict embodiments of a mounting base configured to secure a holder to a structure, such as a wall or an interior surface of a display cabinet, in accordance with certain embodiments of the present disclosure.
Figure 6B:
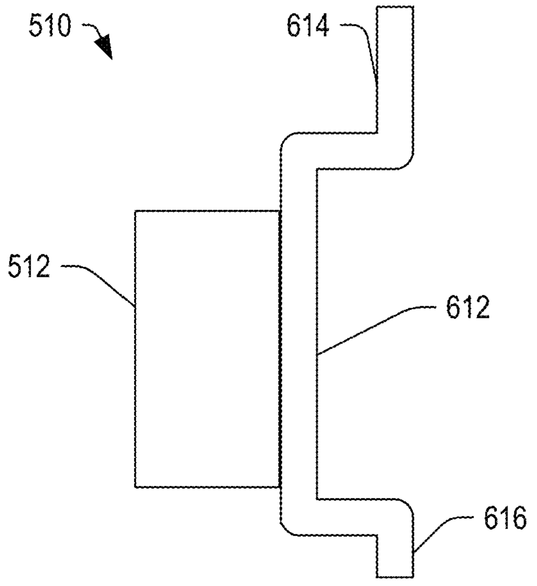
Figure 6C:
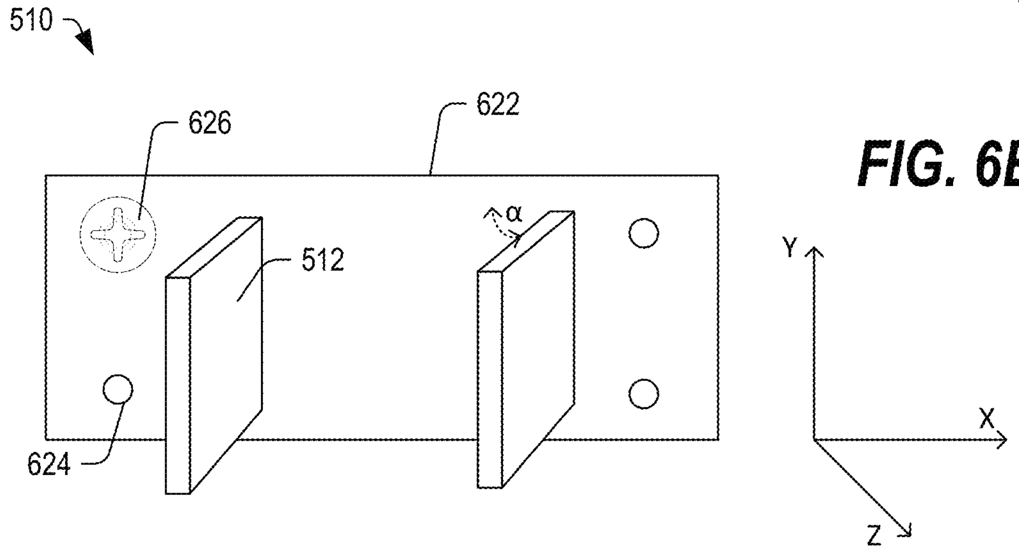

FIGS. 6A-6C depict embodiments of a mounting base configured to secure a holder to a structure, such as a wall or an interior surface of a display cabinet, in accordance with certain embodiments of the present disclosure. In FIG. 6A, the mounting base 510 is depicted as a hook shape including a first portion 602 coupled to the coupling feature 512, a second portion 604 extending substantially perpendicular to the first portion 602, and a third portion 606 extending parallel to the first portion 602 to form a hook shape. The third portion 606 may extend behind a slit in the wall (or supporting structure, such as a cabinet), and the second portion 604 may extend through an opening in the wall, and the first portion 602 may rest on a surface of the wall.

FIG. 6B depicts an embodiment of the mounting base 510 implemented as a z-clip including a first portion 612 coupled to the coupling feature 512, a second portion 614 configured to fit through a first opening in a wall (or other supporting structure), and a third portion 616 configured to fit through a third opening in the wall or supporting structure. Other embodiments are also possible FIG. 6C depicts an embodiment of the mounting base 510 implemented as a plate 622 that can be affixed to a wall or support structure. The plate 622 may be coupled to the coupling feature 512. The plate 622 may include a plurality of openings 624. In some embodiments, a fastener 626 may be placed in one of the openings 624 and tightened to affix the plate 622 to a wall or support structure. In the illustrated example, the fastener 626 is depicted as a threaded fastener, such as a screw. In other embodiments, the fastener 626 may be a nail, a hook, or another type of fastener configured to affix the plate 622 to the structure. Other embodiments are also possible.

It should be appreciated that the coupling feature 512 may be coupled to the plate 622 at an angle ($\alpha$) that is other than perpendicular relative to the surface (the X-Y plane) of the plate 622 (e.g., in the Y-Z plane). The coupling feature 512 extends substantially parallel to the ground (and perpendicular to the surface of the plate 622 in terms of the Y-axis. By providing the coupling features 512 at an angle other than perpendicular, the holder 116 may extend and retract relative to the surface of the support structure at the angle ($\alpha$). The angle allows the holder 116 to be extended and retracted in a smaller area than if the holder 116 extended perpendicular to the surface. By maintaining a perpendicular angle with respect to the Y-axis, the holder 116 may remain in an extended or a retracted state where the user leaves it. Other embodiments are also possible.

Figure 7A:
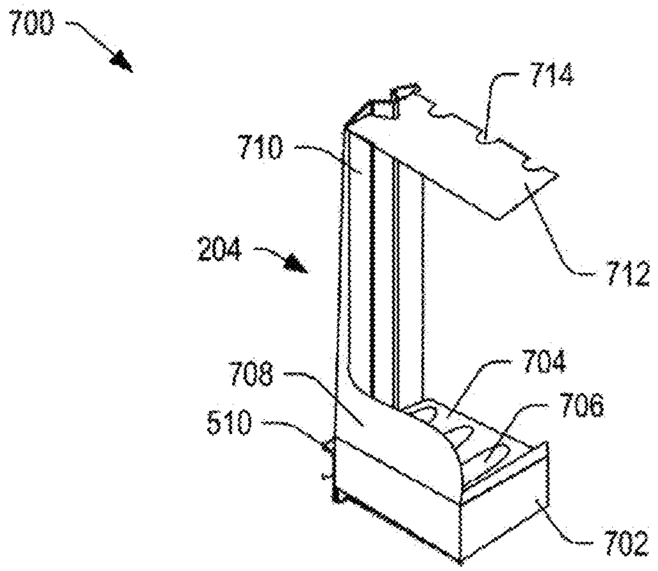
FIG. 7A depicts a perspective view of a display device, in accordance with certain embodiments of the present disclosure.

FIG. 7A depicts a perspective view of a display device 700, in accordance with certain embodiments of the present disclosure. The display device 700 can include all of the elements of the display devices described above with respect to FIGS. 1-6C. Further, the display device 700 may be used within a cabinet or may be coupled to a surface of a structure, such as a wall, a shelving unit, another structure, or any combination thereof.

The display device 700 may include a base 702 coupled to a mounting bracket 510, such as the mounting bracket 510 shown in FIGS. 5 through 6C. The base 702 may be configured to support a holder 704 including a plurality of depressions or inset features 706, which may be configured to support a stock or butt of a firearm. The device 700 may further include a frame 204 including a vertical member 710 and a side support 708. The device 700 may further include an arm 712 including a plurality of gripper elements 714, which may be configured to engage a muzzle of a firearm.

In some embodiments, the display device 700 may be configured to support a variety of elongate items, such as fishing rods, baseball bats, golf clubs, firearms, other elongate devices, or any combination thereof. Further, the display device 700 may be configured to extend and retract relative to a surface to which the mounting bracket 510 is secured. Slider elements, wheels, or other features may be included within the mounting base 702 and configured to move relative to a guide element coupled to the mounting bracket 510 to allow the device 700 to slide in and out like a drawer.

Figure 7B:
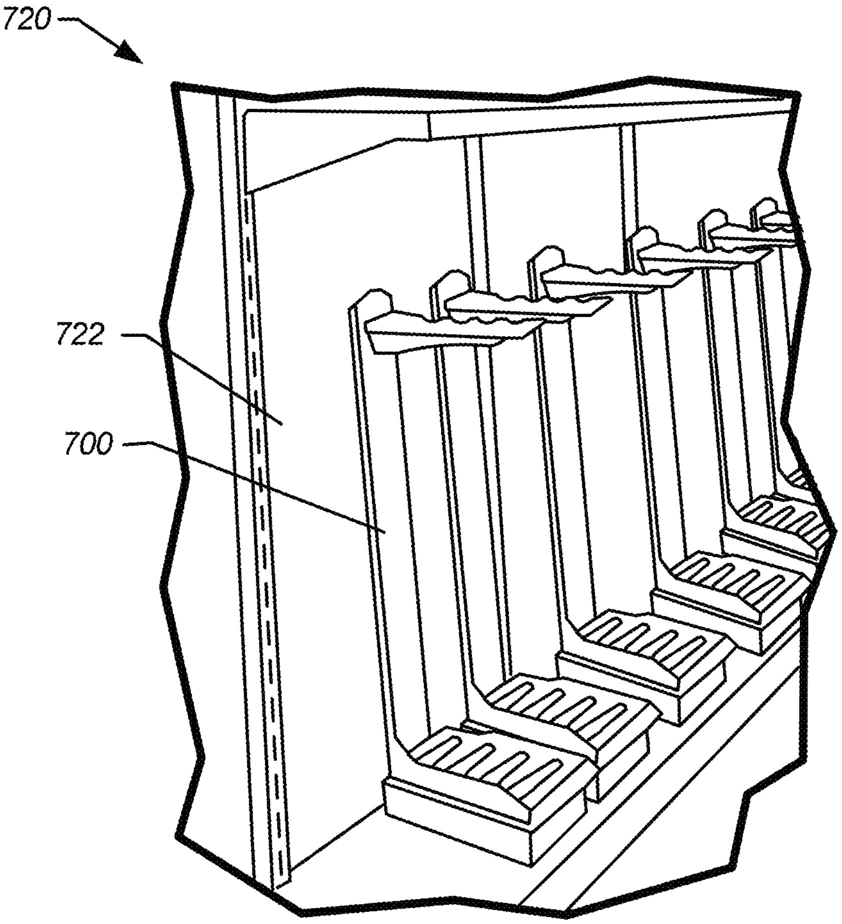
FIG. 7B depicts a picture of a row of display devices, such as the display device of FIG. 7A, in accordance with certain embodiments of the present disclosure.

FIG. 7B depicts a picture 720 of a row of display devices 700, in accordance with certain embodiments of the present disclosure. In some examples, the display devices 700 may be configured to slide out at an angle that is perpendicular to the surface 722 to which the device 700 is attached. In other examples, the display device 700 may be configured to slide at an angle that is other than perpendicular relative to the surface 722.

In conjunction with the devices and structures described above with respect to FIGS. 1-7B, a display device is disclosed that can include plurality of holders mounted to drawer hardware and configured to slide away from and toward a surface of a structure, such as a wall, an interior surface of a cabinet, another device, or any combination thereof. In some embodiments, each holder may include a mounting structure configured to couple the holder to the surface. In some examples, the mounting structure may couple the holder to the surface at an angle other than perpendicular to the surface. Each holder may include a frame and one or more gripping elements to secure an item, such as a firearm. Further, in some embodiments, one or more of the holders may be disposed within a cabinet. The cabinet may include sliding doors mounted within tracks to allow the cabinet to be closed and locked and to be opened to allow access to the enclosure.

While the above-discussion focused on an implementation configured to secure and display firearms, other implementations are possible. For example, the cabinet may be configured to display a plurality of elongate objects, such as pool cues, baseball bats, golf clubs, firearms, fishing poles, other elongate objects or any combination thereof. In the context of construction, the cabinet may be used to display various wood options or designs, handrails, and so on. Other embodiments are also possible.

Although the present invention has been described with reference to preferred embodiments, workers skilled in the art will recognize that changes may be made in form and detail without departing from the scope of the invention.

What is claimed is:

1. A display device comprising:

a support structure disposed on a horizontal surface and disposed proximate a vertical surface, the support structure comprising two support sidewalls connected to a top wall;

a holder configured to slide over the support structure toward the vertical surface to a first position and away from the vertical surface to a second position in a horizontal plane and at an angle in the horizontal plane other than perpendicular relative to the vertical surface;

a drawer slide mechanism operably connecting one of the two support sidewalls and an inner surface of the holder;

a mounting base configured to couple to the vertical surface; and a pair of coupling features extending from the mounting base at the angle, each of the coupling features attached to one of the two support sidewalls.

2. The display device of claim 1, further comprising a cabinet defining an enclosure having cabinet sidewalls and a base, the enclosure sized to receive the holder and optionally one or more additional holders.

3. The display device of claim 2, wherein the cabinet further comprises:

sliding doors to open to allow access and to close to restrict access to the enclosure; and a locking mechanism coupled to the sliding doors to selectively secure the sliding doors in a closed and locked state.

4. The display device of claim 2, wherein in the second position, the holder extends beyond a cabinet sidewall.

5. The display device of claim 1, wherein the holder comprises:

a base portion including a plurality of cavities, each said cavity to secure a proximal end of an object;

a frame coupled to the base portion and extending substantially vertically relative to the base portion; and an arm coupled to the frame and including a plurality of gripper elements, each said gripper element to secure a second portion of the object.

6. The display device of claim 5, wherein the object comprises at least one of a firearm, a golf club, a baseball bat, and a fishing pole.

7. The display device of claim 5, wherein each of the support sidewalls comprises a track configured to engage the drawer slide mechanism of the base portion to enable the holder to slide.

8. The display device of claim 5, wherein the base portion comprises a foam material.

9. The display device of claim 4, wherein the base portion comprises a fabric covering.

10. The display device of claim 5, wherein the base portion comprises a substantially parallelogram shape.

* * * * *